United States Patent
Coleman

[19]

[11] Patent Number: 5,910,886
[45] Date of Patent: Jun. 8, 1999

[54] PHASE-SHIFT POWER SUPPLY

[75] Inventor: Charles Coleman, Fort Collins, Colo.

[73] Assignee: Sierra Applied Sciences, Inc., Boulder, Colo.

[21] Appl. No.: 08/966,489

[22] Filed: Nov. 7, 1997

[51] Int. Cl.[6] ............................................. H02M 3/335
[52] U.S. Cl. ................................................. 363/17; 363/98
[58] Field of Search ............................. 363/17, 28, 97, 363/98, 131, 132; 204/298.08

[56] References Cited

U.S. PATENT DOCUMENTS

| | | | |
|---|---|---|---|
| 4,103,324 | 7/1978 | Vandervelen et al. | 363/89 |
| 4,648,017 | 3/1987 | Nerone | 363/28 |
| 4,931,169 | 6/1990 | Scherer et al. | 204/298.11 |
| 4,936,960 | 6/1990 | Siefkes et al. | 204/192.38 |
| 4,963,238 | 10/1990 | Siefkes et al. | 204/192.12 |
| 4,981,566 | 1/1991 | Wurczinger | 204/192.13 |
| 5,006,213 | 4/1991 | Sichmann et al. | 204/192.14 |
| 5,009,764 | 4/1991 | Siefkes et al. | 204/298.08 |
| 5,074,984 | 12/1991 | Sichmann et al. | 204/192.14 |
| 5,108,571 | 4/1992 | Ludwig et al. | 204/192.13 |
| 5,126,033 | 6/1992 | Szczyrbowski et al. | 204/298.08 |
| 5,192,894 | 3/1993 | Teschner | 315/111.21 |
| 5,303,139 | 4/1994 | Mark | 363/98 X |
| 5,427,669 | 6/1995 | Drummond | 204/298.08 |

FOREIGN PATENT DOCUMENTS

| | | |
|---|---|---|
| 0553410 A1 | 8/1993 | European Pat. Off. . |
| 221202 A1 | 4/1985 | Germany . |
| 229160 A1 | 10/1985 | Germany . |
| 3919147 A1 | 12/1990 | Germany . |
| 3121389 A1 | 8/1992 | Germany . |
| 4113704 A1 | 10/1992 | Germany . |
| 57-69324 | 4/1982 | Japan . |
| 61-30665 | 2/1986 | Japan . |
| 63-190168 | 8/1988 | Japan . |
| 3-56671 | 3/1991 | Japan . |
| 3-61368 | 3/1991 | Japan . |
| 2045553 | 3/1980 | United Kingdom . |

OTHER PUBLICATIONS

"Designing a Phase Shifted Zero Voltage Transition (ZVT) Power Converter" by Bill Andreycak, Unitrode Power Supply Design Seminar, Mar. 25, 1993, pp. 3–1 to 3–15.

Beisswenger, T. et al., "Economical Considerations on Modern Web Sputtering Technology", Society of Vacuum Coaters, 35th Annual Technical Coinference Proceedings, pp. 128–134 (1992).

Anderson, L., "A New Technique for Arc Control in DC Sputtering", Society of Vacuum Coaters, 35th Annual technical Conference Proceedings, pp. 325–329 (1992).

Schatz, Doug, "The MDX as a Strategic Tool in reducing Arcing", Application Notes, Advanced Energy Industries, Inc. (1985).

Primary Examiner—Peter S. Wong
Assistant Examiner—Y. J. Han
Attorney, Agent, or Firm—Klaas, Law, O'Meara & Malkin, P.C.; Bruce E. Dahl, Esq.

[57] ABSTRACT

Power supply apparatus according to the present invention may comprise a direct current source and a phase-shift converter circuit connected to the direct current source. A rectifier is connected to the output of the phase-shift converter circuit and rectifies a modulated output signal produced by the phase-shift converter circuit. An average current sensor connected to the rectifier senses the time average current in the rectifier and produces an average current feedback signal. A control device connected to the average current sensor and to the phase-shift converter circuit is responsive to the average current feedback signal and operates the phase-shift converter circuit in accordance with the average current feedback signal.

23 Claims, 5 Drawing Sheets

PHASE-SHIFT POWER SUPPLY

FIELD OF INVENTION

The present invention relates to power supplies for plasma processing systems in general and more specifically to high-speed, switchable power supplies for sputter deposition systems.

BACKGROUND

Plasma deposition refers to any of a wide variety of processes in which a plasma is used to assist in the deposition of thin films or coatings onto the surfaces of objects. For example, plasma deposition processes are widely used in the electronics industry to fabricate integrated circuits and other electronic devices, as well as to fabricate the magnetic tapes and disks used in audio, video, and computer applications. Plasma deposition processes may also be used to apply coatings to various objects to improve or change the properties of the objects. For example, plasma deposition processes may be used to apply wear resistant coatings to machine tools, while other types of coatings may be used to increase the corrosion resistance of other items, such as bearings, turbine blades, etc, thereby enhancing their performance. In still other applications, plasma deposition may be used to apply coatings to various types of surfaces in the optics and glass industries.

In most plasma deposition processes the plasma is created by subjecting a low-pressure process gas (e.g., argon) contained within a vacuum chamber to an electric field. The electric field, which is typically created between two electrodes, ionizes the process gas and creates the plasma. In the case of a DC sputter deposition plasma process, the material (commonly referred to as the target) to be deposited on the object or substrate is connected as the negative electrode (i.e., cathode), whereas some other element, commonly the vacuum chamber itself, is connected as the positive electrode or anode. Ionized process gas atoms comprising the plasma are accelerated toward and ultimately impact the negatively charged cathode/target, dislodging or sputtering atoms from the target material. The sputtered atoms subsequently condense on various items in the chamber, including the substrate that is to be coated. The substrate is usually positioned with respect to the target so that a majority of the sputtered target atoms condense on the surface of the substrate.

Sputter deposition processes of the type described above are usually referred to as "non-reactive" processes in that the sputtered atoms deposited on the surface of the substrate do not react with other materials. However, sputter deposition processes have also been developed wherein the target material is sputtered in the presence of a reactive material (e.g., oxygen or nitrogen gas). Such "reactive" sputtering processes may be used to deposit a film comprising the sputtered target material and the reactive species. A wide variety of compounds, such as $SiO_2$, $Al_2O_3$, $Si_3N_4$, and $TiO$, can be deposited by reactive sputter deposition processes.

While it is a relatively simple matter to connect a power supply (e.g., a DC power supply) to the electrodes and generate the plasma, it is considerably more difficult to produce and control the plasma so that the deposition process will consistently produce coatings of the desired quality. One of the main difficulties in this regard is that the plasma is generally quite unstable and is subject to rapid and significant variations in electrical impedance. These impedance variations are related to a variety of factors, including the type of material being deposited, the pressure within the chamber, the strength of the magnetic field used to confine the plasma, and other extrinsic factors. Regardless of the cause, the impedance variations create many problems and contribute to certain phenomenon that occur within the chamber, most of which are deleterious to the deposition process.

One common phenomenon is the periodic occurrence of electrical discharges or arcs within the vacuum chamber. Such electrical discharges or arcs can take on different forms depending on the characteristics of the apparatus and on the particular plasma process being used. For example, arcs may occur between the target material and the substrate itself, certainly causing a defect in the coating, if not ruining the substrate entirely. Alternatively, arcs may occur between the target and some other part of the vacuum chamber, in which case the deleterious effects of such arcs are usually less severe, but nevertheless tend to degrade the overall quality of the coating. The arcs can be short lived, lasting only a few milliseconds or so, or may be continuous, again depending on the particular apparatus and process being used.

The impedance variations and plasma phenomenon (e.g., arcing) described above generally preclude the use of a simple DC power supply in most applications. As a result, many different types of power supplies have been developed over the years in an effort to compensate for these problems. For example, most power supplies used to accomplish DC sputter deposition processes may be operated in either a constant current or constant power mode. Operating the power supply so that it provides constant current or power to the plasma tends to minimize some of the problems relating to the impedance instability of the plasma and enhances the overall deposition process. Unfortunately, such power supplies do little to reduce the occurrence of arcs, and systems utilizing such power supplies still tend to be plagued by the occurrence of arcs within the process chamber.

Partly in an effort to reduce the occurrence of arcs within the process chamber, many DC power supplies have been developed which are capable of temporarily removing the voltage potential on the electrodes when an arc condition is detected. One such type of power supply is the phase controlled SCR power supply. Essentially, this type of power supply utilizes one or more silicon controlled rectifiers (SCRs) to turn-off the power supply when desired (e.g., such as upon the detection of an arc condition within the chamber), then turn it back on when the condition subsides. While most phase controlled SCR power supplies can be turned off in the time required for the AC input current to cross through zero volts (i.e., in about 8.33 milliseconds (ms) for a single phase 60 Hz input), such a response time is almost always too slow to be of any use, particularly for arc suppression purposes. While SCR power supplies utilizing three-phase input power can be turned on and off in approximately one-third the time (e.g., in about 2.8 ms for a three-phase 60 Hz input), this is still not fast enough for satisfactory arc suppression in most plasma processes.

Another type of power supply design is the switching power supply. In a switching power supply, the AC input power is first rectified to DC. The DC is then converted back to AC by a suitable switching converter. Such switching type power supplies are capable of considerably faster switching speeds (i.e., response times) compared with phase controlled SCR power supplies, thus are generally preferred over the SCR power supplies.

Unfortunately, however, switching power supplies have not proven to be a panacea and many are plagued with their own problems and disadvantages. For example, while most switching power supplies are theoretically capable of much faster response times than phase controlled SCR supplies, their response times are often limited by the numerous feedback networks often required for the stable, controlled operation of the power supplies, particularly when the power supplies are operated at low power levels. Indeed, when operated at low power levels, the feedback networks of many power supplies reduce the effective response times of the supplies to the point where they perform little better than the SCR supplies which they were designed to replace. Yet another problem with switching power supplies is that they are prone to excessive power dissipation, which usually limits their maximum power output. Consequently, switching power supplies often cannot be used in plasma processes requiring high input powers. Still another problem with switching power supplies is that many supplies contain excessive capacitance in the switching devices which, again, tends to limit the response times of the power supplies and also tends to create instabilities when they are operated at low power levels.

Accordingly, a need remains for an improved DC power supply for plasma processing systems. Such an improved power supply should be capable of fast response to allow maximum control over the plasma, particularly when operated at low power levels. Additional advantages could be realized if the power supply could also be operated over a wide range of plasma impedances and with a minimum of internal power dissipation.

SUMMARY OF THE INVENTION

Power supply apparatus according to the present invention may comprise a direct current source and a phase-shift converter circuit connected to the direct current source. A rectifier is connected to the output of the phase-shift converter circuit and rectifies a modulated output signal produced by the phase-shift converter circuit. An average current sensor connected to the rectifier senses the time-averaged current in the rectifier and produces an average current feedback signal. A control device connected to the average current sensor and to the phase-shift converter circuit is responsive to the average current feedback signal and operates the phase-shift converter circuit in accordance with the average current feedback signal.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
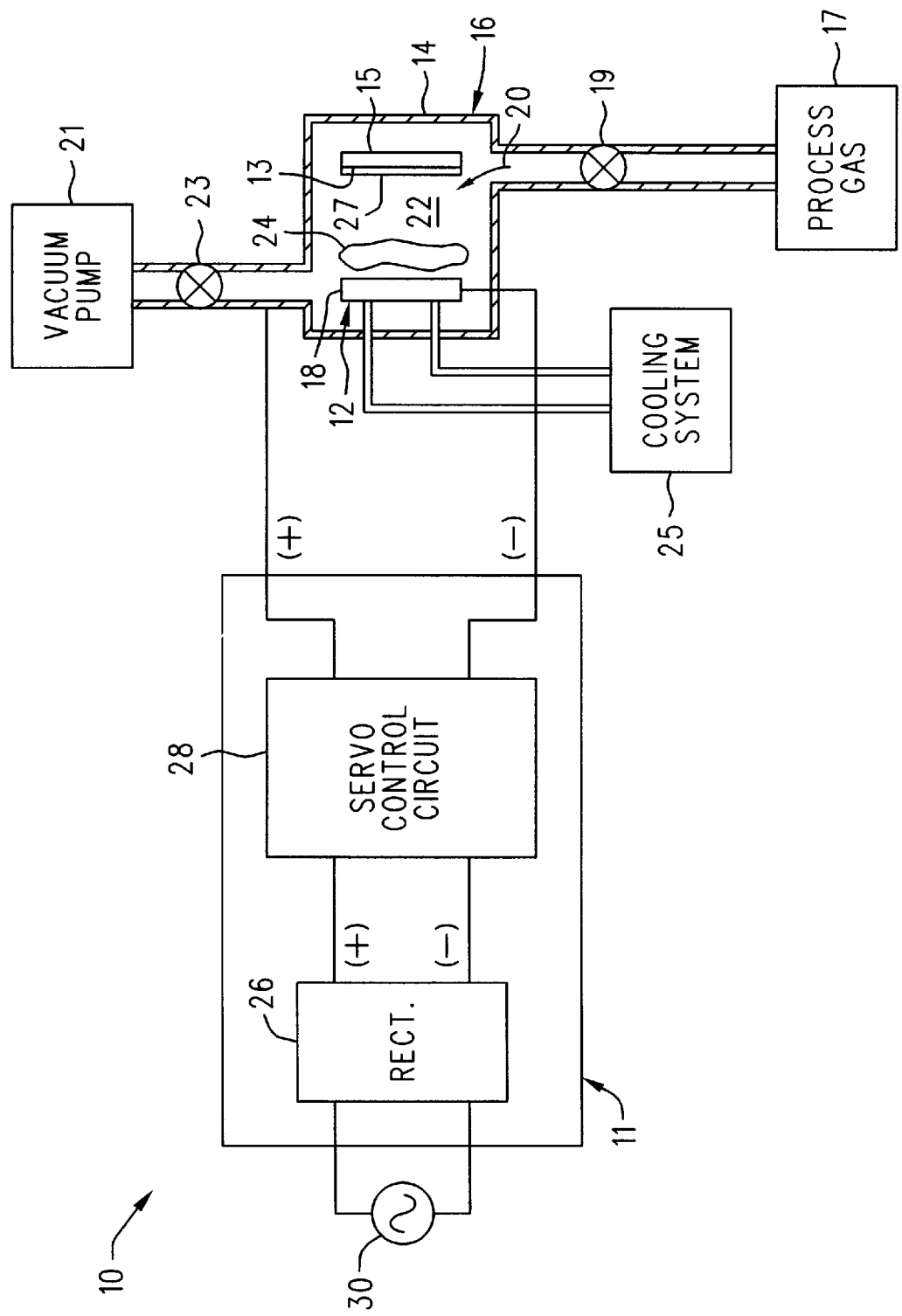
FIG. 1 is a schematic representation of one embodiment of a plasma processing system incorporating a phase-shift power supply according to the present invention.

One embodiment of a plasma processing system 10 that incorporates a phase-shift power supply 11 is shown in FIG. 1 as it could be used to accomplish a DC sputter deposition process. The DC sputter deposition process may be used to deposit a thin film 27 onto the surface 13 of a substrate 15 positioned within a vacuum or process chamber 16. The phase-shift power supply 11 produces an electric field (not shown) between a pair of electrodes 12 and 14 that are also contained within the process chamber 16. The first electrode 12 may comprise a cathode/target assembly 18 and the second electrode 14 may comprise any convenient anode member, such as the vacuum chamber 16 itself. The electric field (not shown) created by the phase-shift power supply 11 ionizes the process gas (indicated by arrow 20) contained within the interior 22 of process chamber 16, thus creating a plasma 24. In one embodiment, the plasma 24 is confined in a region generally adjacent the cathode/target assembly 18 by a magnetic field (not shown) associated with the cathode/target assembly 18, (i.e., magnetron sputtering). Alternatively, the cathode/target assembly 18 could comprise a non-magnetically enhanced cathode/target assembly, as in the case of diode sputtering.

Figure 5:
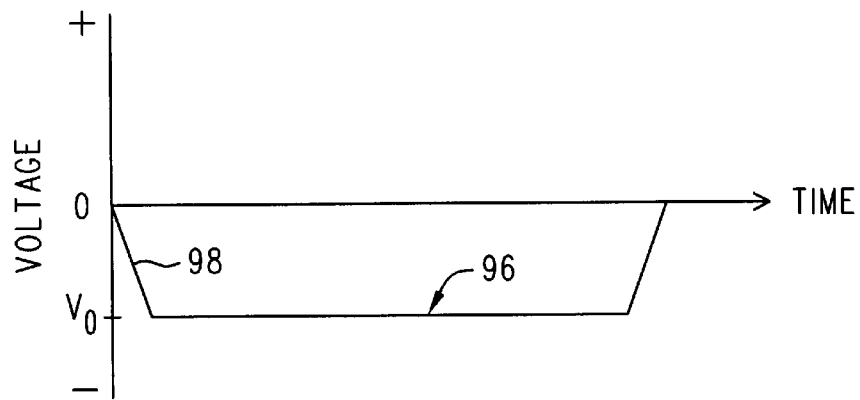
FIG. 5 is a graphical representation of a DC output signal placed on the cathode.

The phase-shift power supply 11 may comprise a rectifier circuit 26 and a servo control circuit 28 to produce a DC output signal 96 (FIG. 5). The DC output signal 96 may then be applied to the first electrode 12 (i.e., the cathode/target assembly 18). The rapid response characteristics of the phase-shift power supply 11 allow the DC output signal 96 to be modulated (i.e., turned "on" or "off") or varied (i.e., by changing the operating voltage $V_o$) quite rapidly to compensate for variations in the impedance of the plasma 24. Consequently, the phase-shift power supply 11 will allow for improved control over the plasma process being carried out within chamber 16.

Figure 4:
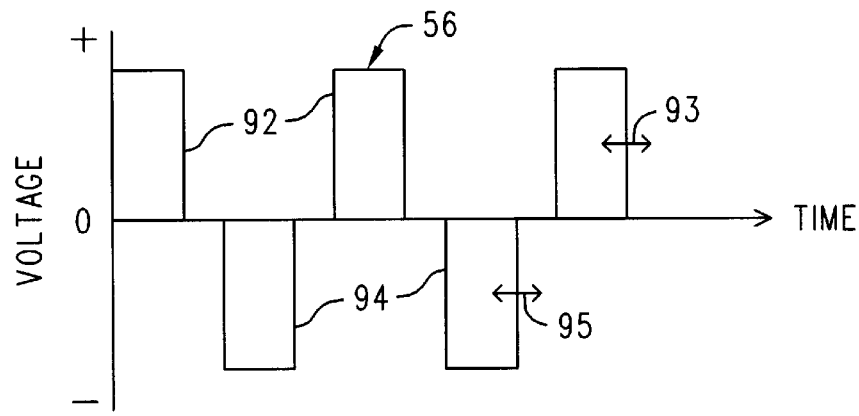
FIG. 4 is a graphical representation of a pulsed output signal on the primary winding of the transformer shown in FIG. 2.

The rectifier circuit 26 may be connected to a suitable supply of electrical power, such as an alternating current (AC) power source 30. The rectifier circuit 26 converts alternating current produced by the AC power source 30 into a direct current (i.e., DC) which is suitable for use by the servo control circuit 28. The servo control circuit 28 comprises a phase-shift converter circuit 36 (FIG. 2) which produces a modulated output signal 56 (FIG. 4). The modulated output signal 56 is then rectified to produce the DC output signal 96 (FIG. 5).

Figure 2:
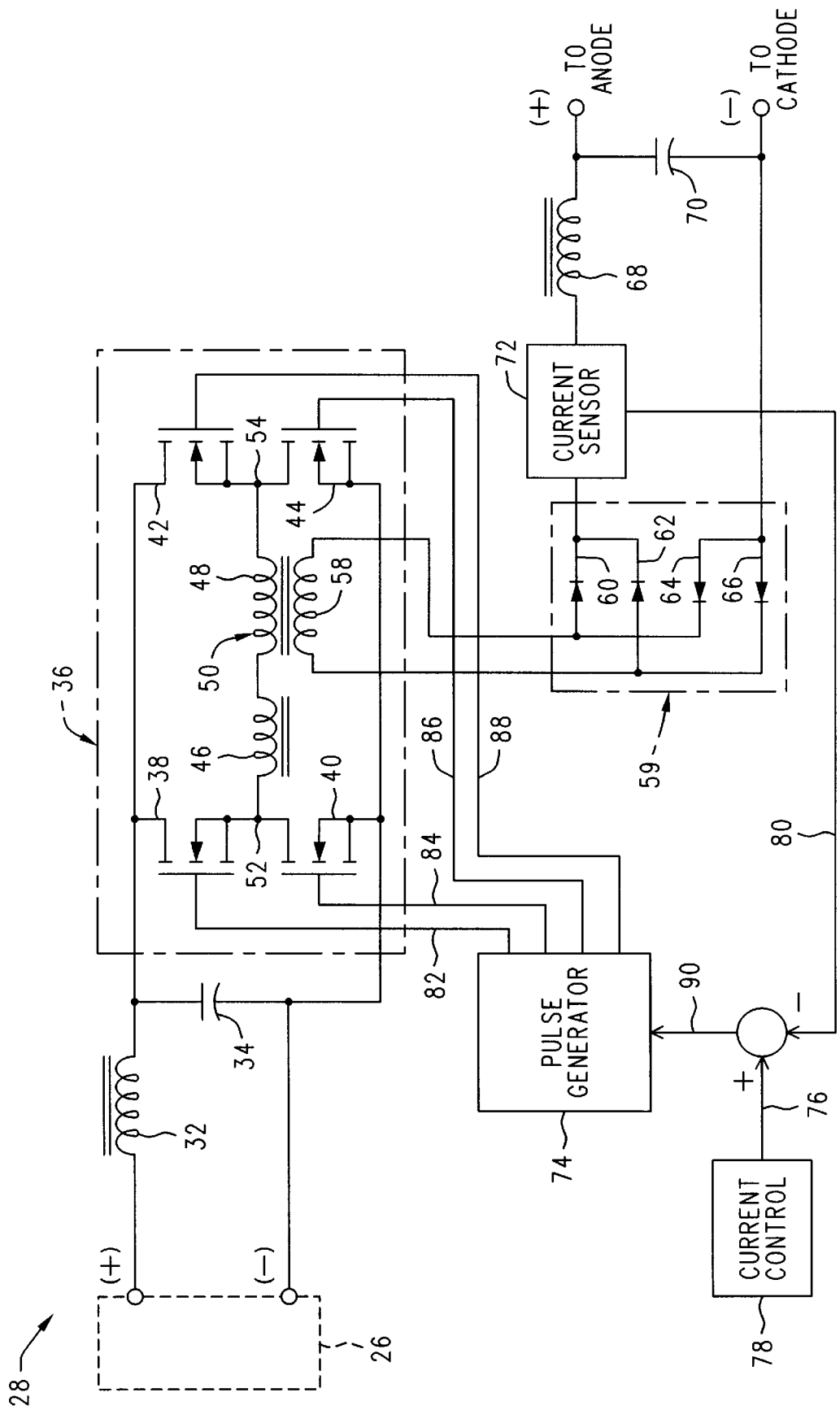
FIG. 2 is a schematic representation of one embodiment of the servo control circuit shown in FIG. 1.

Referring now to FIG. 2, the servo control circuit 28 may comprise a first inductor 32 and a first capacitor 34 connected in series across the positive (+) and negative (−) terminals of the rectifier circuit 26. The phase-shift converter circuit 36 is connected across the first capacitor 34 and comprises a first pair of switching devices 38, 40 and a second pair of switching devices 42, 44. The first and second pairs of switching devices (i.e., 38, 40, and 42, 44) are connected in parallel in the manner shown in FIG. 2. A choke 46 and the primary winding 48 of a transformer 50 are connected in series across a first circuit node 52 (located between the first and second switching devices 38 and 40) and a second circuit node 54 (located between the third and fourth switching devices 42 and 44).

The secondary winding 58 of transformer 50 is connected across a diode bridge 59 formed by diodes 60, 62, 64, and 66. A second inductor 68 and a second capacitor 70 are connected in series across the output (i.e., DC side) of the diode bridge 59, i.e., between the cathodes of diodes 60 and 62 and the anodes of diodes 64 and 66. The positive (+) output terminal of servo control circuit 28 may be connected to the anode (e.g., the process chamber 16). The negative (−) output terminal may be connected to the cathode/target assembly 18. See also FIG. 1. A current sensor 72 may be connected between second inductor 68 and the cathodes of diodes 60 and 62. Current sensor 72 senses the time-averaged current of the servo control circuit 28 and generates an average current feedback signal 80.

Each of the switching devices 38, 40, 42, and 44 are connected to a pulse generator 74 which produces a plurality of output signals 82, 84, 86, and 88 suitable for switching each of the switching devices 38, 40, 42, and 44 between a non-conducting or open state and a conducting or closed state. Pulse generator 74 controls the various switching devices 38, 40, 42, and 44 based on an error signal 90. In one preferred embodiment, the error signal 90 comprises the difference between a current set signal 76 (which may be provided by a suitable control circuit 78) and the average current feedback signal 80.

Figure 6:
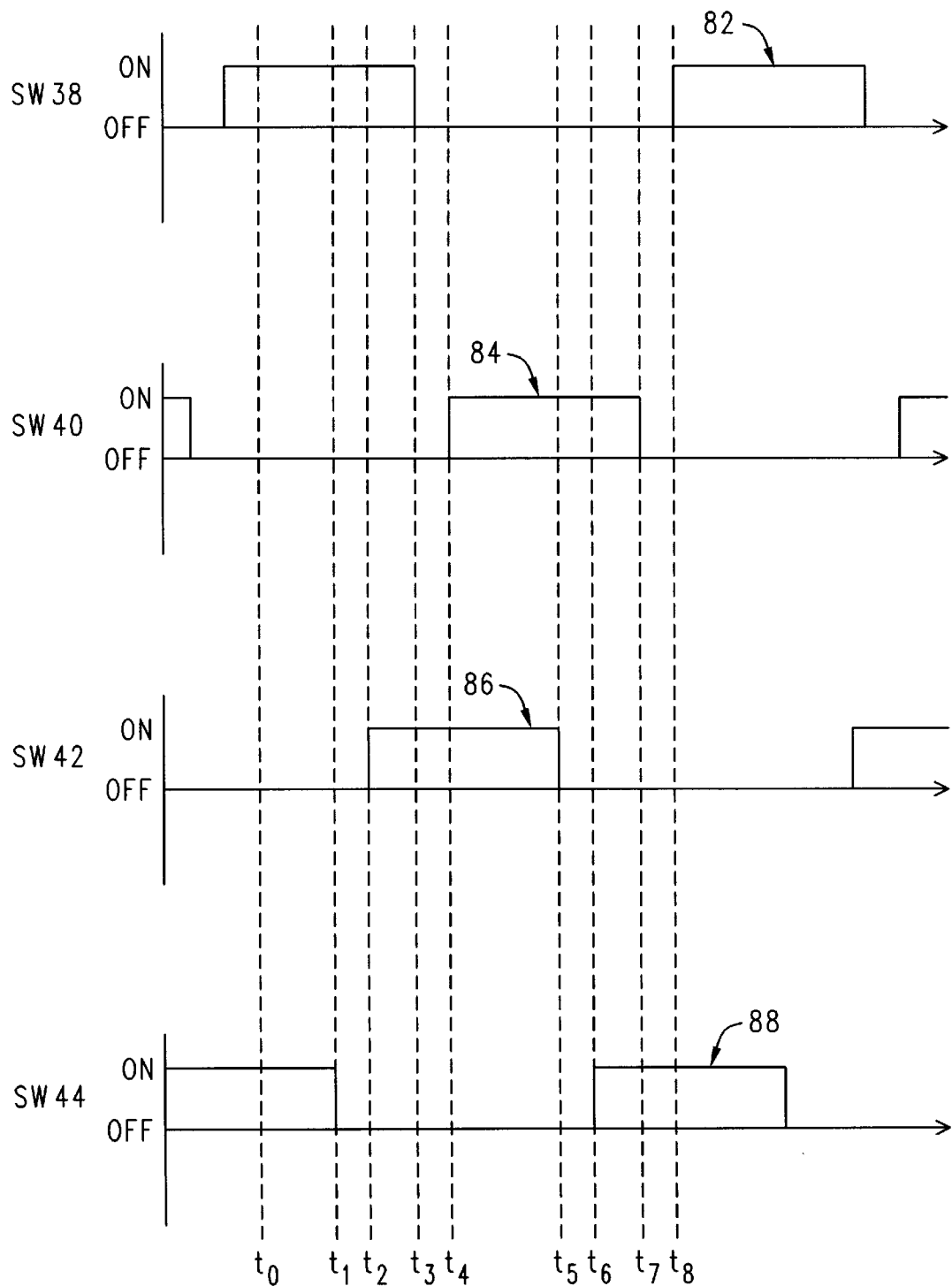
FIG. 6 is a graphical representation of the phase-shifted control signals used to actuate the various switching devices comprising the servo control circuit.

Referring now to FIG. 6, the various control signals 82, 84, 86, and 88 are phase-shifted with respect to one another to allow each of the switching devices 38, 40, 42, and 44 to be switched between the conducting and non-conducting states when the potential across each respective switching device is substantially zero volts. Such phase-shifted switching improves response time of the power supply 11, particularly at low power levels, and minimizes power losses due to power dissipation within the various switching devices 38, 40, 42, and 44.

Briefly, the phase-shifted switching method utilized by the servo control circuit 28 involves the out-of-phase (i.e., phase-shifted) switching of the various switching devices 38, 40, 42, and 44. That is, instead of driving both of the diagonal switching devices (e.g., 38 and 44 or 40 and 42) together, in phase, as is commonly done in conventional switching power supplies used in plasma processing systems, the diagonal switching devices utilized in the present invention are turned on and off in the phase-shifted manner shown in FIG. 6. The phase-shifted switching method allows two of the switching devices in series with the primary winding 48 of transformer 50 to be "on" (i.e., conducting) while the applied voltage to the primary winding 48 is substantially zero, thus minimizing the power dissipation in the switching devices 38, 40, 42 and 44.

One aspect of the phase-shifted switching method that is important in achieving the objects and advantages of the present invention is that the time wherein only a single switching device is "on" should be made as short as possible to maximize the power that can be provided by the circuit. Thus, in the example shown in FIG. 6, the time (e.g., the time between $t_1$ and $t_2$) wherein only a single switching device (e.g., switching device 38) is on should be made as short as possible. In one preferred embodiment, the "single switch on time" (e.g., the time between $t_1$ and $t_2$) may be in the range of 0.05 μs to 1.0 μs (0.2 μs preferred).

The operation of the phase-shift power supply 11 is best understood by considering an example representative of a typical use of the phase-shift power supply 11 to accomplish sputter deposition at substantially constant current. Alternatively, other modes (e.g., constant power or constant voltage) may also be used, as will be described below. The desired current output of the phase-shift power supply 11 may be selected by the current control circuit 78 which produces a current set signal 76. The average current feedback signal 80 may be subtracted from the current set signal 76 to produce an error signal 90. The pulse generator 74 then actuates the various switching devices 38, 40, 42, and 44 in accordance with the error signal 90 to produce the modulated output signal 56, which appears across the primary winding 48 of transformer 50.

Referring now to FIG. 4, the modulated output signal 56 comprises a plurality of positive pulses 92 and negative pulses 94. The widths of each of the plurality of positive and negative pulses 92, 94 may be varied (as indicated by arrows 93 and 95, respectively) which varies the total power delivered to the secondary winding 58 of transformer 50. In the embodiment shown and described herein, shorter pulse widths correspond to lower powers while longer pulse widths correspond to higher powers. The pulse generator 74 operates the phase-shift converter circuit 36 to produce a modulated output signal 56 having the appropriate pulse widths to achieve an output power level commensurate with the desired current output of the power supply 11. The modulated output signal 56 is then rectified by the diode bridge circuit 59 and filtered by second inductor 68 and capacitor 70 to produce a DC output signal 96 (FIG. 5) which is then provided to the first and second electrodes 12 and 14.

A significant advantage of the phase-shift power supply 11 of the present invention is that it provides relatively rapid response characteristics, thereby allowing the power supply to respond more quickly to variations in the impedance of the plasma 24. The ability to more rapidly control the DC output signal 96 provides for improved control over the plasma process being performed in the chamber 16, particularly when the power supply is operating at relatively low power levels. The DC output signal 96 may also be modulated (i.e., turned on and off) and/or the voltage $V_o$ varied to provide additional control of the plasma 24. Another advantage of the phase-shift power supply 11 is that its more rapid response characteristics allow it to provide more stable operation at higher plasma impedances and at lower power levels than was typically possible with prior art switching power supplies.

Another significant feature of the phase-shift power supply 11 it that it utilizes only a single feedback loop to control the DC output signal 96. The single average current feedback loop associated with the circuit topology shown and described herein substantially reduces the response time of the servo control circuit 28, which again affords superior control over the DC output signal 96, thus the plasma process being carried out in chamber 16.

Still other advantages are associated with the phase-shifted switching technique used to operate the converter circuit 36. For example, since the phase-shifted switching technique allows the switching elements to be switched between the conducting and non-conducting states when the potential across each switching device is substantially zero volts, the phase-shifted switching technique minimizes the power dissipation in the switching devices, thereby improving efficiency and allowing smaller switching devices to be used for a given output power. Alternatively, the circuit may provide increased output power with switching devices of a given capacity. Another advantage is that the phase-shifted switching technique significantly reduces the "pulse stretching" phenomenon that is typically associated with conventional pulse width modulated converter circuits.

Figure 3:
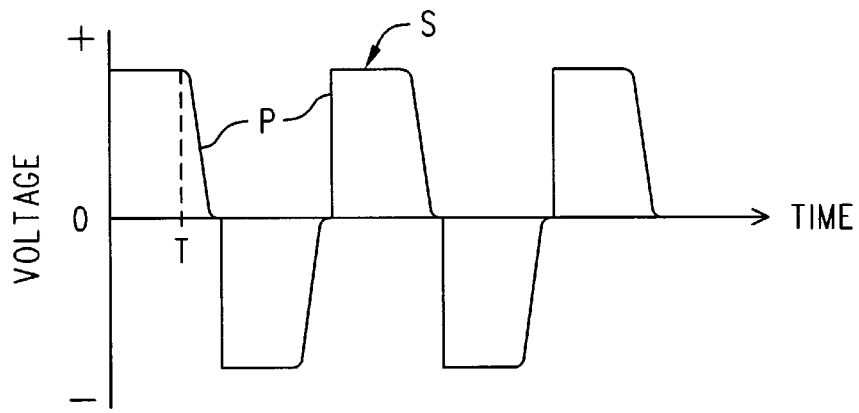
FIG. 3 is a graphical representation of a pulsed output signal from a conventional converter circuit showing the pulse stretching phenomenon that occurs when the converter circuit contains excessive internal capacitance.

For example, referring now to FIG. 3, a conventional pulse width modulated converter circuit may produce an output signal S comprising a plurality of pulses P. Extraneous capacitance introduced by the switching devices and other circuit elements tends to slow the decay of each pulse P, thus lengthening or "stretching" the length (i.e., time duration) of the pulse P beyond the desired turn-off time T. Consequently, it is difficult to control precisely the output power and current produced by conventional pulse width modulated converter circuits. The pulse stretching phenomenon also tends to slow the response time of the power supply.

Having briefly described the plasma processing system 10 utilizing the phase-shift power supply circuit 11 according to the present invention, as well as some of its more significant features and advantages, the preferred embodiments of the plasma processing system 10 and phase-shift power supply 11 will now be described in detail.

Referring back now to FIG. 1, one embodiment of the plasma processing system 10 incorporating the phase-shift power supply 11 is shown and described herein as it could be used to accomplish a non-reactive DC sputter deposition process. The deposition process may be used to deposit a thin film or coating 27 onto the surface 13 of a substrate 15 positioned within a vacuum or process chamber 16. Alternatively, however, the plasma processing system 10 and phase-shift power supply 11 could also be used to accomplish other types of plasma processes, such as reactive sputter deposition. Therefore, the present invention should not be regarded as limited to the non-reactive sputter deposition process shown and described herein.

The phase-shift power supply 11 may be used to produce an electric field (not shown) between a first electrode 12 and a second electrode 14 also positioned within the process or vacuum chamber 16. More specifically, the first electrode 12 may comprise a cathode/target assembly 18 which contains the material (not shown) that is to be deposited on the surface 13 of the substrate 15. The second electrode 14 may comprise any of a wide range of convenient anode members, such as the process chamber 16.

In accordance with its use to perform non-reactive sputter deposition processes, the process chamber 16 may also include a process gas supply 17 which contains a quantity of a suitable process gas (arrow 20), such as argon, although other gases may also be used. A process gas valve 19 connected between the process gas supply 17 and the process chamber 16 may be used to regulate the flow of process gas 20 into the interior 22 of chamber 16. The process chamber 16 may also include a vacuum pump assembly 21 and a vacuum valve assembly 23 to maintain the interior 22 of the process chamber 16 within a range of pressures suitable for carrying out the desired process. For example, in most magnetron sputter deposition processes it is usually desirable to maintain the interior 22 of the process chamber 16 at a pressure of about 1 milliTorr (mTorr), although other pressures could also be used depending on the nature of the material being deposited and on other extrinsic factors. The cathode/target assembly 18 may be provided with a cooling system 25 to prevent the cathode/target assembly 18 from overheating.

It should be noted that process chambers (e.g., vacuum chamber 16), as well as the various ancillary devices and systems (e.g., process gas supply systems, pumping systems, etc.) associated therewith, are well-known in the art and could be easily provided by persons having ordinary skill in the art after having become familiar with the teachings of the present invention. Therefore, the particular process chamber 16 and related ancillary systems and devices utilized in one preferred embodiment of the invention will not be described in further detail.

If it is desired to configure the plasma processing system 10 to accomplish reactive sputter deposition, then the process chamber 16 may also be provided with a reactant gas source (not shown) that contains a supply of a suitable reactant gas. Examples of suitable reactant gases include, but are not limited to, oxygen ($O_2$), nitrogen ($N_2$), and hydrogen sulfide ($H_2S$). The reactant gas source (not shown) may also include a valve assembly (also not shown) to regulate the flow of the reactant gas into the interior 22 of process chamber 16. However, since such additional systems and devices required to accomplish reactive sputter deposition processes are also well-known in the art and could be easily provided by persons having ordinary skill in the art after having become familiar with the present invention, the additional systems and devices that may be required or desired to accomplish reactive sputter deposition also will not be described in further detail herein.

The phase-shift power supply 11 may comprise a rectifier circuit 26 and a servo control circuit 28 to produce a DC output signal 96 (FIG. 5) which is then placed across the first electrode 12 (e.g., the cathode/target assembly 18) and the second electrode 14 (e.g., a suitable anode member, such as the process chamber 16). The rectifier circuit 26 may be connected to a suitable supply of electrical power, such as an alternating current source 30. The rectifier circuit 26 converts the alternating current (AC) produced by the alternating current source 30 to a direct current (DC) suitable for use by the servo control circuit 28. In one preferred embodiment, the alternating current source 30 comprises a conventional 3 phase, 60 Hz alternating current supply and the rectifier circuit 26 rectifies the 3-phase AC into DC. Alternatively, the alternating current source 30 may comprise a single phase supply in which case the rectifier circuit 26 would convert the single phase alternating current into DC. In any event, since rectifier circuits for converting 3-phase or single phase alternating current into direct current are well known, the rectifier circuit 26 utilized in one preferred embodiment will not be described in further detail herein.

Referring now to FIG. 2, the servo control circuit 28 comprises a first inductor 32 and a first capacitor 34 connected in series across the positive (+) and negative (−) terminals of the rectifier circuit 26. The first inductor 32 and first capacitor 34 add inductive and capacitive reactance to the circuit and help dampen the power fluctuations resulting from the operation of the phase-shift converter circuit 36. Accordingly, the first inductor 32 and the first capacitor 34 may comprise any of a wide range of values depending on the design voltage and power levels of the particular power supply 11, as well as on other extrinsic considerations. Thus, the present invention should not be regarded as limited to any particular values or ranges of values for the first inductor 32 and capacitor 34. By way of example, in one preferred embodiment the first inductor 32 may have an inductance in the range of about 0.5 millihenrys (mH) to 10 mH (1.0 mH preferred), and the first capacitor 34 may have a capacitance in the range of about 10 microfarads ($\mu F$) to 10,000 $\mu F$ (1,500 $\mu F$ preferred).

The converter circuit 36 is connected across the first capacitor 34 and comprises a first pair of switching devices 38 and 40 connected across capacitor 34 and a second pair of switching devices 42 and 44 also connected across the first capacitor 34. That is, the second pair of switching devices 42, 44 are connected in parallel with the first pair of switching devices 38, 40. A choke 46 and the primary winding 48 of a transformer 50 are connected in series across a first circuit node 52 and a second circuit node 54. The first circuit node 52 is located between the first and second switching devices 38 and 40, whereas the second circuit node 54 is located between the third and fourth switching devices 42 and 44. Converter circuit 36 may be provided with an optional capacitor 47 (FIG. 7) connected in series between the choke 46 and the first circuit node 52. Such a capacitor 47 may be desirable in preventing flux imbalance in the transformer which, under certain conditions, may overload one or more of the switching devices.

Figure 7:
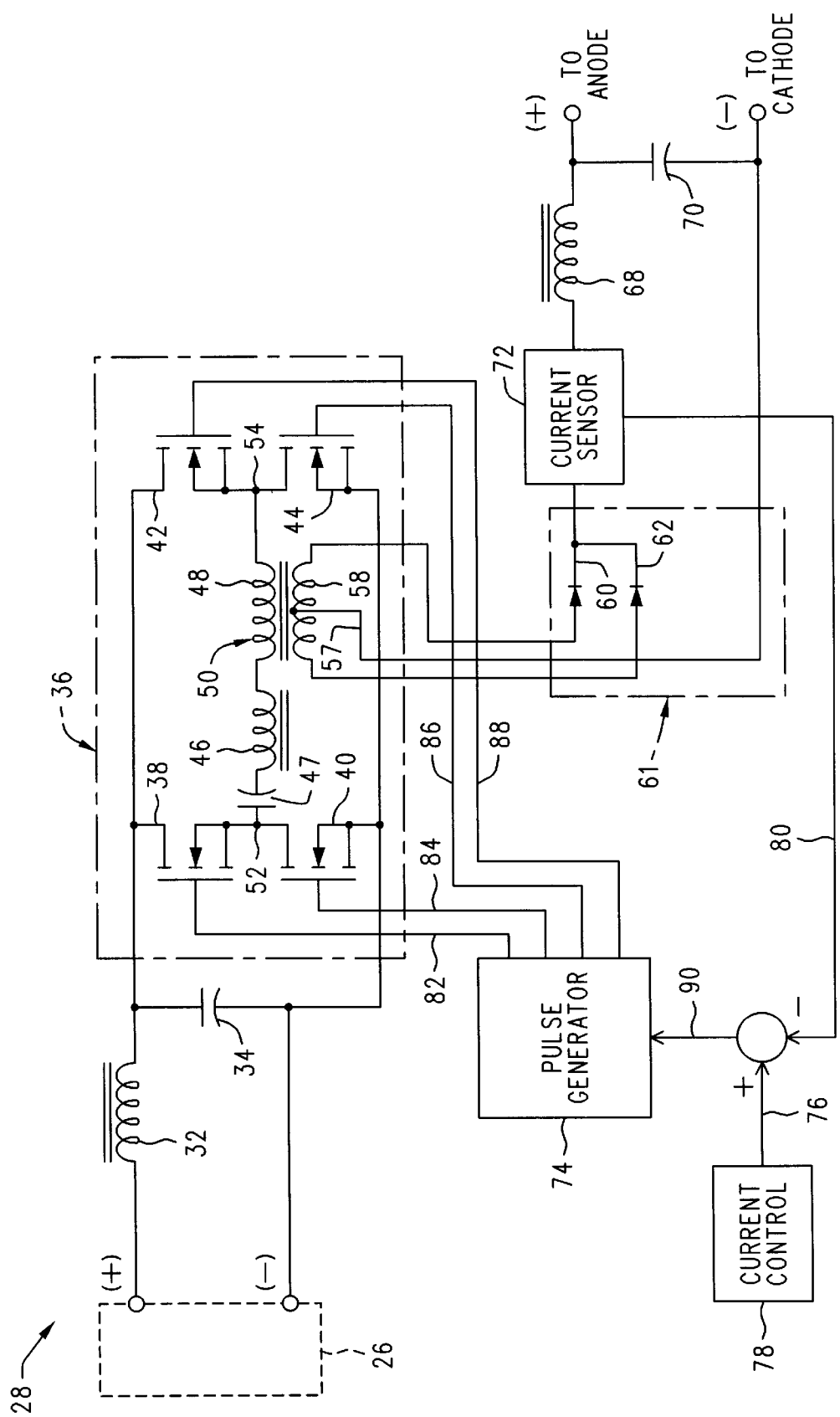
FIG. 7 is a schematic representation of a second embodiment of the servo control circuit shown in FIG. 1.

The secondary winding 58 of transformer 50 is connected across a diode bridge circuit 59 formed by diodes 60, 62, 64, and 66. A second inductor 68 and a second capacitor 70 are connected in series across the DC side of the diode bridge circuit 59, i.e., between the cathodes of diodes 60 and 62 and the anodes of diodes 64 and 66. The positive (+) and negative (−) output terminals of the servo control circuit 28 are connected across the second capacitor 70. The positive (+) and negative (−) output terminals may be connected directly to the anode (e.g., vacuum chamber 16) and cathode/target assembly 18, respectively. A current sensor 72 connected between second inductor 60 and the cathodes of diodes 60 and 62 senses the average output current of the servo control circuit 28 and produces an average current feedback signal 80. Alternatively, the four diodes 60, 62, 64, 66 comprising the diode bridge circuit 59 could be replaced with a diode bridge circuit 61 (FIG. 7) comprising two diodes (60, 62) by providing the secondary winding 58 of transformer 50 with a center tap lead 57 (FIG. 7).

The values for the various components described above may vary depending on the particular application and circuit design, as well as on other extrinsic factors. Consequently, the present invention should not be regarded as limited to any particular values or ranges of values for the various components. However, by way of example, in one preferred embodiment wherein the voltage across the output terminals of the rectifier circuit 26 is in the range of 250 volts to 375 volts and wherein the expected output current of the power supply 11 is expected to be in the range of 0.0 amperes (A) to 50 A, the second inductor 68 may have an inductance in the range of about 0.1 millihenrys (mH) to 1.0 mH (0.15 mH preferred). The second capacitor 70 may have a capacitance in the range of about 0.1 microfarads ($\mu$F) to 10 $\mu$F (1.0 $\mu$F preferred). The rectifying diodes 60, 62, 64, and 66 may be rated at 1,200 volts (V) and 30 amperes (A). The current sensor 72 may comprise a model no. LP-100 current sensor available from LEM USA, Inc., of Milwaukee, Wis., although other devices could also be used.

In one preferred embodiment, the switching devices 38, 40, 42, and 44 of the converter circuit 36 comprise MOSFETs rated at 500 V and 71 A, such as type APT50M60JN available from Advanced Power Technology, Inc., of Bend, Oreg. Alternatively, other types of switching devices may also be used, provided such devices are capable of switching the anticipated voltages and currents at the speeds required. For example, each switching device 30, 40, 42, and 44 could comprise an insulated gate bipolar transistor (IGBT) connected in parallel with a suitable diode to provide the equivalent circuit to the internal body diode inherent in MOSFETs.

The inductance of the choke 46 will depend in part on the inductance and leakage inductance of the primary winding 48 of transformer 50 as well as on the various parameters used to operate the converter circuit 36 to accomplish substantially zero voltage switching, as will be described below. However, since such zero voltage switching techniques are known in the art, the selection of the appropriate inductances would be obvious to persons having ordinary skill in the art after choosing the final circuit configuration and operational parameters for a particular application. Therefore, the choke 46 should not be regarded as limited to any particular inductance or range of inductances. By way of example, in one preferred embodiment, the choke 46 has an inductance of 0.002 mH.

The transformer 50 may have a turns ratio commensurate with the voltage produced by the rectifier circuit 26 and the desired output voltage. In one preferred embodiment, the transformer 50 has a turns ratio of 6:28. That is, the primary winding 48 comprises 6 turns, whereas the secondary winding 58 comprises 28 turns. Alternatively, other turns ratios could also be used.

Each of the switching devices 38, 40, 42, and 44 are connected to a pulse generator 74 which produces a plurality of control signals 82, 84, 86, and 88 suitable for switching the respective switching devices 38, 40, 42, and 44 between non-conducting or open states and conducting or closed states. Pulse generator 74 controls the various switching devices 38, 40, 42, and 44 based on an error signal 90. In one preferred embodiment, the error signal 90 is derived by subtracting the average current feedback signal 80 from the current set signal 76 produced by the current control circuit 78.

The control signals 82, 84, 86, and 88 produced by the pulse generator 74 are phase-shifted with respect to one another to allow each of the switching devices 38, 40, 42, and 44 to be switched between the conducting and non-conducting states when the potential across each respective switching device is substantially zero volts. Such phase-shifted, and preferably zero voltage, switching minimizes power losses due to dissipation within the various switching devices 38, 40, 42, and 44. While such zero voltage switching methods are well-known in the art and could be easily implemented by persons having ordinary skill in the art after having become familiar with the details of this invention, the zero voltage switching method used in one preferred embodiment will now be briefly described in order to provide a better basis for understanding the advantages of the servo control circuit 28 as they relate to the present invention.

Basically, the zero voltage switching method of servo control circuit 28 involves the out-of-phase (i.e., phase-shifted) switching of the switching devices 38, 40, 42, and 44. That is, instead of driving both of the diagonal switching devices (e.g., 38 and 44 or 40 and 42) together, in phase, the diagonal switching devices are turned on and off in a phase-shifted manner. The phase-shifted switching method allows two of the switching devices in series with the primary winding 48 of transformer 50 to be "on" (i.e., conducting) while the applied voltage to the primary winding 48 is zero or substantially zero, thus facilitating the zero voltage switching of the switching devices 38, 40, 42 and 44.

The operation of the converter circuit 36 may be better understood by considering a hypothetical example. Referring now to FIGS. 2 and 6 simultaneously, the converter circuit 36 is operated by the various control signals 82, 84, 86, and 88 which are used to control the switching devices 38, 40, 42, and 44, respectively. At a time $t_0$, both control signals 82 and 88 (which control switching devices 38 and 44, respectively) are "on" (i.e., switching devices 38 and 44 are both conducting), while both diagonal switching device control signals 84 and 86 (which control switching devices 40 and 42) are "off," (i.e., switching devices 40 and 42 are non-conducting). Then, at a time $t_1$, control signal 88 (i.e., switching device 44) is turned off, however control signal 82 (i.e., switch 38) is still "on." A short time later ($t_2$), while control signal 82 (i.e., switch 38) is still on, control signal 86 (i.e., switch 42) is turned on. Switches 38 and 42 both remain on for a time before control signal 82 (i.e., switch 38) is turned off at time $t_3$. Then, a short time later, at time $t_4$, control signal 84 (i.e., switch 40) is turned on, so that both diagonal switches (i.e., 40 and 42) are turned on. At time $t_5$, control signal 86 (i.e., switch 42) is turned off, leaving on only switch 40. Again, after a short time, at time $t_6$, control signal 88 (i.e., switch 44) is again turned on. Switches 40 and 44 both remain on for a short time before control signal 84 (i.e., switch 40) is turned off at $t_7$. Finally, control signal 82 (i.e., switch 38) is again turned on at time $t_8$ and the cycle is repeated.

As was discussed above, one aspect of the phase-shifted switching method that is important in achieving the objects and advantages of the present invention relates to the time wherein only a single switching device is "on" (e.g., the time between $t_1$ and $t_2$ in the example shown in FIG. 6). More specifically, the "single switch on time" should be made as short as possible to maximize the power that can be provided by the circuit. In one preferred embodiment, the "single switch on time" (e.g., the time between $t_1$ and $t_2$) is in the range of 0.05 $\mu$s to 1.0 $\mu$s (0.2 $\mu$s preferred).

The converter circuit 36 may be operated at any of a wide range of switching frequencies to produce the modulated output signal 56 from the DC input current supplied by the rectifier circuit 26. Generally speaking, higher frequencies (e.g., frequencies in the range of 25 kilohertz (kHz) to 200 kHz) are generally advantageous in that they reduce the sizes of the various components and inductances required to achieve zero voltage switching, as described above. In one preferred embodiment, the converter circuit 36 is operated at a switching frequency of 100 kHz.

The phase-shifted switching technique set forth above may be provided relatively easily by the pulse generator 74. In one preferred embodiment, the pulse generator 74 may comprise a model no. UC3875N pulse generator available from Unitrode Integrated Circuits Corporation of Merrimack, N.H., which is specifically designed for phase-shifted control. Alternatively, other pulse generators could also be used.

One advantage of the phase shifted switching technique is that it minimizes the power dissipation in the switching devices, particularly if the switching is accomplished when the potential across each switching device is at or near zero volts. Another advantage associated with the phase-shifted switching technique is that it eliminates the "pulse stretching" phenomenon that is typically associated with conventional pulse width modulated converter circuits commonly used in plasma processing.

For example, a conventional pulse width modulated converter circuit may produce an output signal S comprising a plurality of pulses P substantially as shown in FIG. 3. However, extraneous capacitance introduced by the switching devices and other circuit elements tends slow the decay of each pulse P beyond the desired turn-off time T. The result is a lengthening or "stretching" of each pulse P which adversely affects the precision and response time of the circuit. In contrast, the phase-shifted switching technique employed by the converter circuit 36 of the present invention does not suffer from the pulse stretching phenomenon, thus produces an output signal 56 having much more sharply defined pulses 92, 94.

Referring now to FIG. 4, the modulated output signal 56 comprises a plurality of positive pulses 92 and negative pulses 94. The widths (represented by arrows 93 and 95) of each of the plurality of respective positive and negative pulses 92, 94 are variable, thus providing a means for controlling the voltage of the DC output signal 96 (FIG. 5). That is, the voltage $V_0$ of the DC output signal 96 may be increased or decreased by varying the widths 93 and 95 of the respective positive and negative pulses 92 and 94. It follows, then, that the current flowing through the plasma 24 may be controlled by varying pulse widths 93 and 95 of the modulated output signal 56.

The sharply defined pulses 92 and 94 comprising the modulated output signal 56 also allow the DC output signal 96 (FIG. 5) to be turned on and off quite rapidly. For example, the slew rate 98 (i.e., the change in voltage per unit time) of the DC output signal 96 is quite high, typically on the order of 10 volts per microsecond (V/$\mu$s), thereby allowing the DC output signal 96 to reach a steady state operating voltage $V_0$ (typically about −500 volts) in about 50 $\mu$s. The high slew rates associated with the present invention provide enhanced control over the plasma process.

As mentioned above, the phase-shift power supply 11 may be operated in a current mode to provide substantially constant current to the plasma 24 contained within the process chamber 16. Alternatively, however, the power supply 11 may be programmed to operate in a constant power mode or, less commonly, a constant voltage mode. In any event, since devices and systems for allowing power supplies to be operated in constant current, power, or voltage are known in the art and could be used with the present invention, the particular devices and systems used to allow the present invention to be operated in any of the three modes (e.g., constant current, power, or voltage) will not be described in further detail.

It is contemplated that the inventive concepts herein described may be variously otherwise embodied and it is intended that the appended claims be construed to include alternative embodiments of the invention except insofar as limited by the prior art.

What is claimed is:

1. A power supply for placing a voltage potential across a first electrode and a second electrode, said first and second electrodes being positioned within a process chamber, comprising:

a direct current source;

a phase-shift converter circuit having an input and an output, the input of said phase-shift converter circuit being connected to said direct current source;

a rectifier having an input and an output, the input of said rectifier being connected to the output of said phase-shift converter circuit, the output of said rectifier being connected to the first and second electrodes;

average current sensing means operatively associated with the output of said rectifier for producing an average current feedback signal indicative of a time averaged output current in said rectifier; and control means operatively associated with said phase-shift converter circuit and said average current sensing means and responsive to the average current feedback signal produced by said average current sensing means for controlling the phase-shift converter circuit.

2. The power supply of claim 1, wherein said phase-shift converter circuit comprises:

a first switching device and a second switching device connected in series across said direct current source;

a third switching device and a fourth switching device connected in series across said direct current source, said third and fourth switching devices being in parallel with said first and second switching devices; and a transformer having a primary winding and a secondary winding, the primary winding of said transformer being connected between a first circuit node located between said first and second switching devices and a second circuit node located between said third and fourth switching devices.

3. The power supply of claim 2, wherein said control means comprises a pulse generator for producing a first control signal, a second control signal, a third control signal, and a fourth control signal, said first, second, third, and fourth control signals being used to switch each of said first, second, third, and fourth switching devices between conducting states and non-conducting states.

4. The power supply of claim 3, wherein the secondary winding of said transformer includes a center tap winding and wherein said rectifier comprises a full-wave rectifier.

5. The power supply of claim 3, wherein said rectifier comprises a diode bridge circuit connected across the secondary winding of said transformer.

6. The power supply of claim 5, wherein said average current sensing means is connected in series between said diode bridge circuit and the first electrode.

7. The power supply of claim 6, further comprising a choke connected in series with the primary winding of said transformer.

8. The power supply of claim 7, further comprising a capacitor connected in series with said choke.

9. The power supply of claim 1, further comprising a first inductor and a first capacitor connected in series to said direct current source, the input of said phase-shift converter circuit being connected across said first capacitor.

10. The power supply of claim 1, further comprising a second inductor and a second capacitor connected in series across the output of said rectifier, the first and second electrodes being connected across said second capacitor.

11. The power supply of claim 1, further comprising a current control circuit for producing a set current signal, said control circuit also including means for subtracting the average current feedback signal from the set current signal to produce an error signal, and wherein said control means is responsive to the error signal.

12. A power supply for placing a voltage potential across a first electrode and a second electrode, said first and second electrodes being positioned within a process chamber, comprising:

a direct current source having a positive terminal and a negative terminal;

a first inductor and a first capacitor connected in series across the positive and negative terminals of said direct current source;

a first switching device and a second switching device connected in series across said first capacitor;

a third switching device and a fourth switching device connected in series across said first capacitor, said third and fourth switching devices being connected in parallel with said first and second switching devices;

a transformer having a primary winding and a secondary winding;

a choke, said choke and the primary winding of said transformer being connected in series across a first node located between said first and second switching devices and a second node located between said third and fourth switching devices;

a diode bridge having an input and an output, the input of said diode bridge being connected across the secondary winding of said transformer;

a second inductor and a second capacitor connected in series across the output of said diode bridge, the first and second electrodes being connected across said second capacitor;

a current sensor connected to the output of said diode bridge, said current sensor producing an average current feedback signal related to a time averaged current in said diode bridge; and a pulse generator connected to said first, second, third, and fourth switching devices and also connected to said current sensor and responsive to the average current feedback signal, said pulse generator producing a first control signal, a second control signal, a third control signal, and a fourth control signal, said first, second, third, and fourth control signals being used to switch each of said first, second, third, and fourth switching devices between conducting states and non-conducting states.

13. Plasma processing apparatus, comprising:

a process chamber having a first electrode and a second electrode, said process chamber for receiving a process gas and maintaining the process gas within a predetermined pressure range;

a direct current source;

a phase-shift converter circuit having an input and an output, the input of said phase-shift converter circuit being connected to said direct current source;

a rectifier having an input and an output, the input of said rectifier being connected to the output of said phase-shift converter circuit, the output of said rectifier being connected to the first and second electrodes;

average current sensing means operatively associated with the output of said rectifier for producing an average current feedback signal indicative of a time averaged output current produced by said phase-shift converter circuit; and control means connected to said phase-shift converter circuit and to said average current sensing means and responsive to the average current feedback signal produced by said average current sensing means for controlling the phase-shift converter circuit.

14. The plasma processing apparatus of claim 13, wherein said phase-shift converter circuit comprises:

a first switching device and a second switching device connected in series across said direct current source;

a third switching device and a fourth switching device connected in series across said direct current source, said third and fourth switching devices being in parallel with said first and second switching devices; and a transformer having a primary winding and a secondary winding, the primary winding of said transformer being connected between a first circuit node located between said first and second switching devices and a second circuit node located between said third and fourth switching devices.

15. The plasma processing apparatus of claim 14, wherein said control means comprises a pulse generator for producing a first control signal, a second control signal, a third control signal, and a fourth control signal, said first, second, third, and fourth control signals being used to switch each of said first, second, third, and fourth switching devices between conducting states and non-conducting states.

16. The plasma processing apparatus of claim 15, wherein said rectifier comprises a diode bridge circuit connected across the secondary winding of said transformer.

17. The plasma processing apparatus of claim 16, wherein said average current sensing means is connected in series between said diode bridge circuit and the first electrode.

18. The plasma processing apparatus of claim 17, further comprising a choke connected in series with the primary winding of said transformer.

19. The plasma processing apparatus of claim 13, further comprising a first inductor and a first capacitor connected in series to said direct current source, the input of said phase-shift converter circuit being connected across said first capacitor.

20. The plasma processing apparatus of claim 13, further comprising a second inductor and a second capacitor connected in series across the output of said rectifier, the first and second electrodes being connected across said second capacitor.

21. The plasma processing apparatus of claim 13, further comprising a current control circuit for producing a set current signal, said current control circuit also including means for subtracting the average current feedback signal from the set current signal to produce an error signal, and wherein said control means is responsive to the error signal.

22. Plasma processing apparatus, comprising:
   a process chamber having a first electrode and a second electrode, said process chamber for receiving a process gas and maintaining the process gas within a predetermined pressure range;
   a direct current source having a positive terminal and a negative terminal;
   a first inductor and a first capacitor connected in series across the positive and negative terminals of said direct current source;
   a first switching device and a second switching device connected in series across said first capacitor;
   a third switching device and a fourth switching device connected in series across said first capacitor, said third and fourth switching devices being connected in parallel with said first and second switching devices;
   a transformer having a primary winding and a secondary winding;
   a choke, said choke and the primary winding of said transformer being connected in series across a first node located between said first and second switching devices and a second node located between said third and fourth switching devices;
   a diode bridge having an input and an output, the input of said diode bridge being connected across the secondary winding of said transformer;
   a second inductor and a second capacitor connected in series across the output of said diode bridge, the first and second electrodes being connected across said second capacitor;
   a current sensor connected to the output of said diode bridge, said current sensor producing an average current feedback signal related to a time averaged current in said diode bridge; and
   a pulse generator connected to said first, second, third, and fourth switching devices and also connected to said current sensor and responsive to the average current feedback signal, said pulse generator producing a first control signal, a second control signal, a third control signal, and a fourth control signal, said first, second, third, and fourth control signals being used to switch each of said first, second, third, and fourth switching devices between conducting states and non-conducting states.

23. A method for producing a plasma, comprising the steps of:
   providing a vacuum chamber having a first electrode and a second electrode, said vacuum chamber for receiving a process gas and maintaining the process gas within a predetermined pressure range;
   providing a direct current source;
   providing a phase-shift converter circuit having an input and an output, the input of said phase-shift converter circuit being connected to said direct current source;
   generating a modulated output signal with said phase-shift converter circuit, the modulated output signal having a plurality of positive pulses and a plurality of negative pulses;
   rectifying said modulated output signal to produce a DC output signal;
   applying the DC output signal to the first and second electrodes in the vacuum chamber to produce the plasma;
   sensing a current flowing through said plasma; and
   operating the phase-shift converter based on the current flowing through the plasma to vary the widths of the positive and negative pulses to maintain the current flowing through said plasma within a predetermined range.

* * * * *